United States Patent [19]

Shiraki et al.

[11] 3,917,778

[45] Nov. 4, 1975

[54] METHOD FOR SLIP CASTING SOFT FERROMAGNETIC FERRITES

[75] Inventors: Yoichi Shiraki; Shoichi Wakabayashi, both of Tokyo; Mitsunobu Yokoyama, Funabashi; Isao Yokoyama; Shigeji Sugahara, both of Nikaho; Satoshi Ogasawara, Akita, all of Japan

[73] Assignee: TDK Electronics Company, Tokyo, Japan

[22] Filed: Feb. 29, 1972

[21] Appl. No.: 230,226

Related U.S. Application Data

[63] Continuation-in-part of Ser. No. 812,762, April 2, 1969, abandoned.

[52] U.S. Cl. ............... 264/63; 106/308 N; 264/86
[51] Int. Cl.. C04b 35/26; C04b 35/28; C04b 35/36
[58] Field of Search .... 264/86, 56, 61, 63, DIG. 58; 106/308 N

[56] References Cited
UNITED STATES PATENTS

| | | | |
|---|---|---|---|
| 3,113,927 | 12/1963 | Cochardt | 264/DIG. 58 |
| 3,216,841 | 11/1965 | Thellmann | 264/86 |
| 3,322,683 | 5/1967 | Lester | 264/86 |
| 3,549,315 | 12/1970 | Lester et al. | 264/DIG. 58 |
| 3,573,208 | 3/1971 | Brockman et al. | 264/DIG. 58 |
| 3,677,947 | 7/1972 | Ray et al. | 264/DIG. 58 |

OTHER PUBLICATIONS

P. E. Rempes et al, "Slip Casting of Metals, Ceramics, and Cermets," July, 1958, Ceramic Bulletin, pp. 334–339.

G. W. Phelps et al., "Role of Particle-Size Distribution in Nonclay Slip Rheology," Sept., 1971, Ceramic Bulletin, pp. 720–721.

Primary Examiner—Robert F. White
Assistant Examiner—Thomas P. Davelko
Attorney, Agent, or Firm—Lane, Aitken, Dunner & Ziems

[57] ABSTRACT

The method for slip casting soft ferromagnetic ferrites includes forming a powder of soft ferromagnetic ferrite material, the powder having the formula $MeO:Fe_2O_3$ with a molecular ratio of about 1:1. The powder is sized so that it consists of particles having a maximum diameter of about 20 $\mu$, at least about 5% and no more than about 70 percent by weight of the particles having a diameter smaller than about 2 $\mu$. The ferrite powder is suspended in an aqueous solution, the solution is adjusted to have a solids concentration of at least about 50 percent by weight. A dispersing agent is added to the suspension. The suspension is introduced into a water-absorbing mold and a wet casting is formed within the mold. The casting is dehydrated, removed from the mold, and then sintered to complete the process.

2 Claims, 22 Drawing Figures

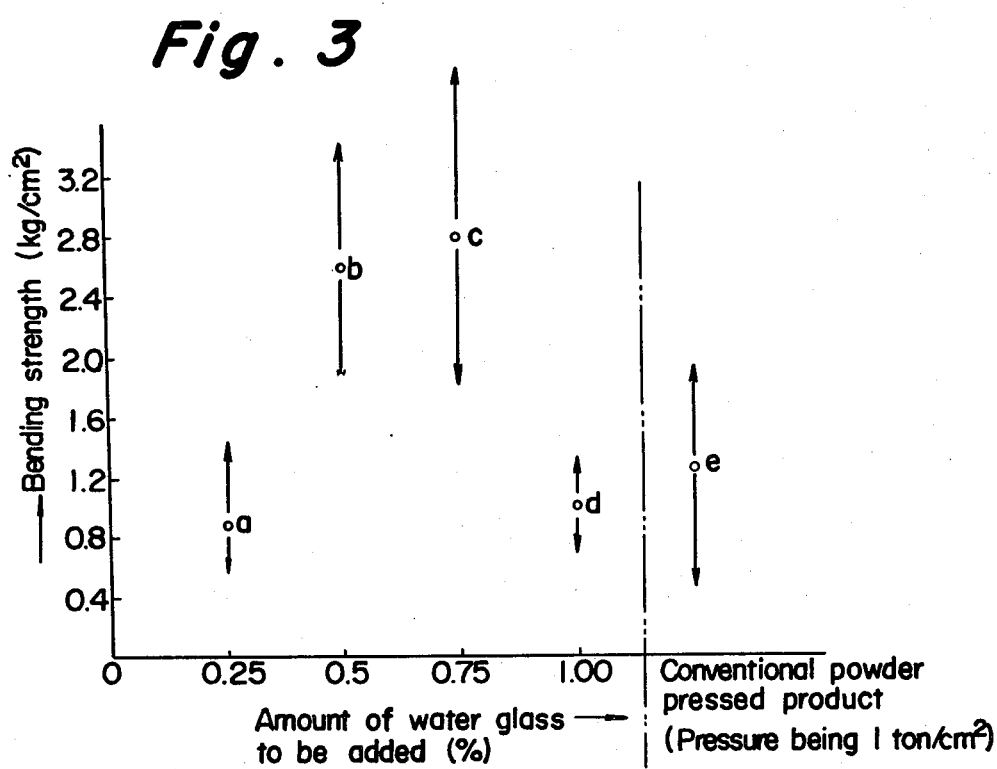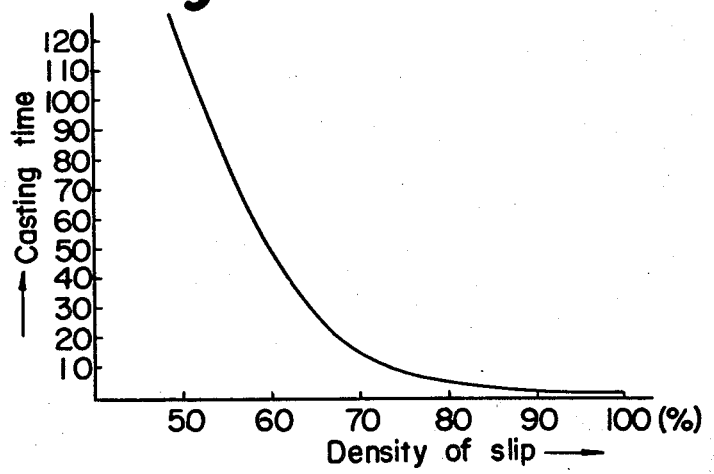

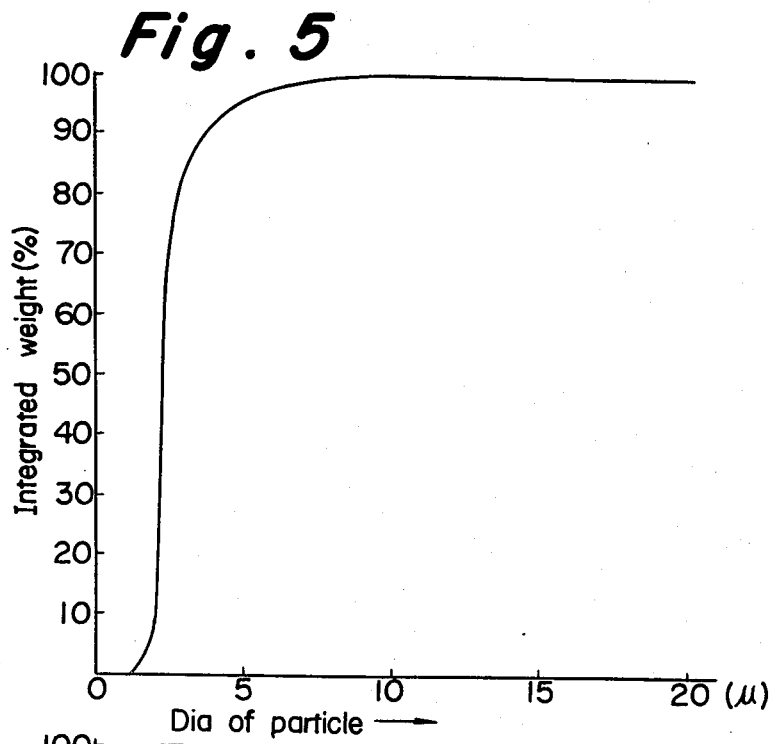
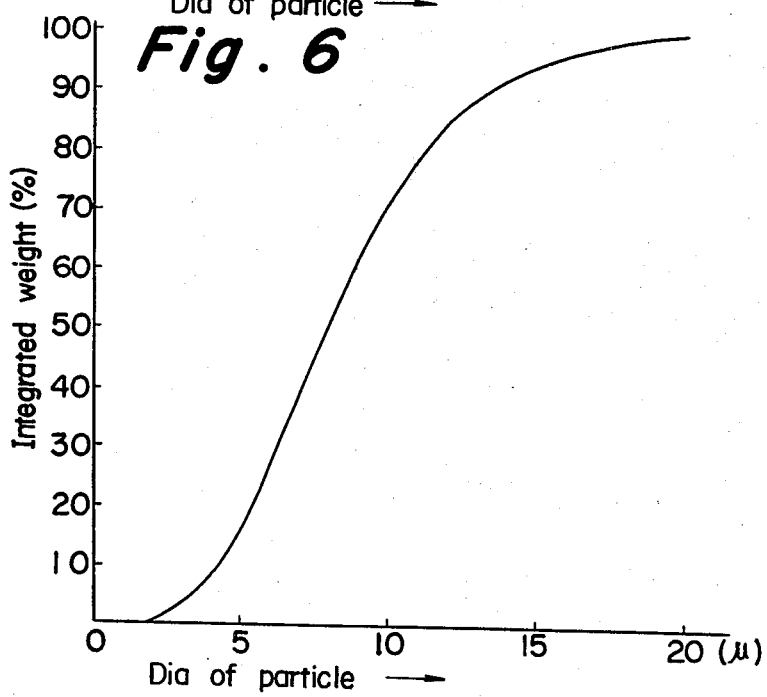

Fig. 17A
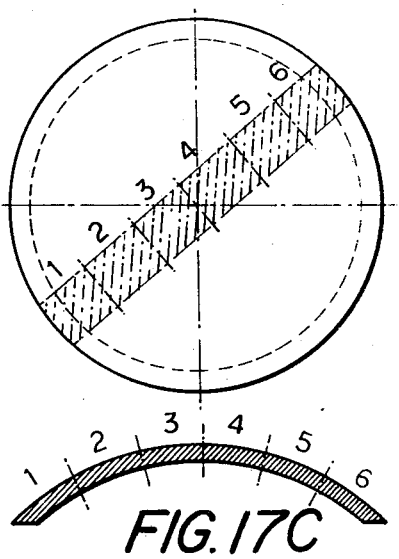
FIG. 17C
Fig. 17B
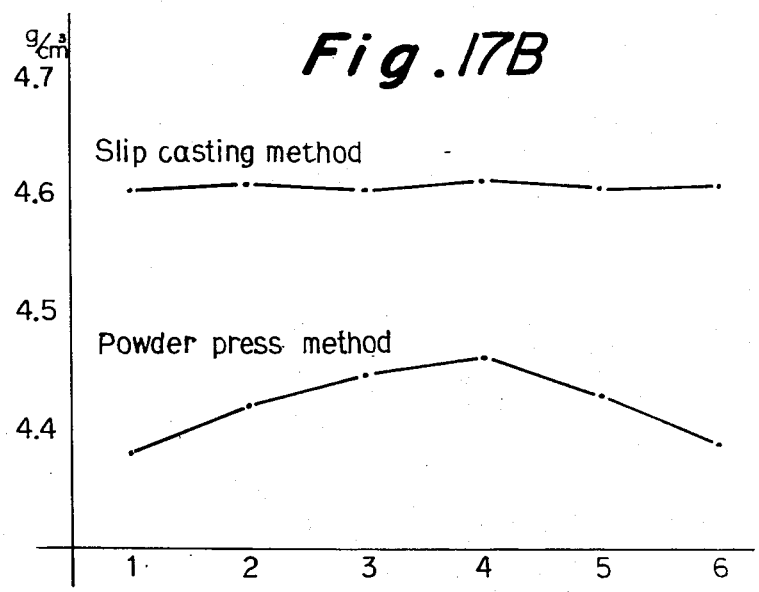

METHOD FOR SLIP CASTING SOFT FERROMAGNETIC FERRITES

BACKGROUND OF THE INVENTION

This application is a continuation-in-part of our co-pending U.S. application, Ser. No. 812,762, filed April 2, 1969, now abandoned.

This invention relates to slip casting magnetic elements, and more particularly to a method for slip casting the soft ferromagnetic ferrites.

In accordance with the teachings of the prior art, magnetic elements such as ferrite cores were made conventionally by the dry-pressing or dust-pressing method. However, the products obtained by this method were not uniform in density, and they had many cracks in their structure and poor mechanical, electrical and magnetic properties. When relatively large magnetic bodies were produced such as flux-keepers, piezoelectric or magnetic transducers and cores for particle accelerators, a large pressing machine was needed which greatly increased the cost of manufacture. In addition, certain types of magnetic bodies such as wide angle deflection yokes are too complicated in shape to be made easily by the pressing method.

In modern electronic technology there is a large demand for magnetic bodies, both large and small, that are complicated in shape. This demand cannot be met by using the conventional dry-pressing method of forming magnetic bodies.

A wet process or slip casting process has been found effective in the casting of ceramic materials, but the process has been found difficult to apply in the casting of materials such as the ferromagnetic ferrites which are relatively non-plastic compared to the ceramic materials. In ceramic technology, the term "slip" is normally used to refer to a fluid suspension of powdered ceramic materials. The powders can be clay-type materials or oxide, carbide, etc., compounds.

The term "slip casting" refers to the pouring of the slip into the cavity of a fluid-absorbing mold, usually made of plaster of Paris, and the penetration of the liquid into the mold by capillary action. A strongly adherent mass of ceramic powder is left in the mold, which upon dehydration is compacted to conform to the shape of the mold cavity. After the liquid has been dehydrated the slip cast compact (called the casting) will have become strong enough to be removed from the mold and handled. The molded ceramic part is further dried and then fired in a kiln, during which shrinkage occurs which operates to increase the density and strength of the casting. Other desired physical properties not pertinent to this application also result from the firing.

This slip casting technique has been applied to non-ceramic materials. However, there is no teaching in the prior art of applying the process to the soft ferromagnetic ferrites. Although Lester et al, U.S. Pat. No. 3,549,315, teaches incidentally that ferrites can be slip cast (see col. 6, lines 3–8), that patent deals exclusively with the "hard" magnetic ferrites. In Lester et al, the $MeO:Fe_2O_3$ ratio is specified as being in the range from about 1:4 to about 1:10, and more specifically at about 1:6. In addition, Lester et al teach that the size of the particles in the casting suspension cannot be more than $2\mu$ in diameter in order for the particles to remain in suspension. As will be seen from the detailed description of the invention below, these and other differences between Lester et al and the invention herein amply show that the two are directed to completely different methods.

SUMMARY OF THE INVENTION

In accordance with the invention, the method for slip casting soft ferromagentic ferrites includes the steps of: 1) forming a powder of soft ferromagentic/ferrite material, the powder having the formula of $MeO:Fe_2O_3$, with a molecular ratio of about 1:1; 2) sizing the powder so that it consists of particles having a maximum diameter of about $20\mu$, at least about 5 percent and no more than about 70 percent by weight of the particles having a diameter smaller than about $2\mu$; 3) suspending the ferrite powder in an aqueous solution, the solution having a solids concentration of at least about 50 percent by weight; 4) adding a dispersing agent to the suspension in the amount of about at least about 0.05 percent by weight; 5) introducing the suspension into a water-absorbing mold; 6) forming a wet casting within the mold; 7) dehydrating the casting; 8) removing the casting from the mold; and 9) sintering the casting.

The ferromagentic ferrite powder that is to be used in the process should have a specific gravity of at least about 3.0 g./cm³. Since the powder is normally sintered before being ground, blended and placed in suspension, the density of the casting will be essentially the same as the density of the powder that is used to form the casting. Thus, the density of the casting should have a density greater than 3.0 g./cm.³. In addition, as will be discussed below, an inorganic dispersing agent such as water glass (sodium silicate) as well as organic dispersing agents such as ammonium alginate and triethylamine can be used in the process.

The inventive process includes a number of steps aside from the basic steps listed above. These include forming a powder consisting of particles having a size distribution falling within specified ranges, blending of two powders having the same composition so that the optimum particle size distribution for the particular application of the invention can be carried out, choosing the appropriate dispersing agent and amount, adjusting the pH of the slip to its optimum value and maintaining the solids concentration at a predetermined optimum level depending on other variables.

All of these features are variables which can be adjusted so that the slip casting of the soft ferromagnetic ferrites can be carried out. The techniques of the invention will be discussed in detail below in conjunction with a number of examples, where products prepared by the inventive process will be compared with products prepared by conventional methods known to the prior art.

DESCRIPTION OF THE DRAWINGS

This invention will be better understood by the following description of a preferred embodiment, taken in conjunction with the accompanying drawings in which:

FIG. 3 shows the mechanical strength of the product of the invention when water glass is used as a deflocculant, in comparison with the strength of the product of a conventional method;

FIG. 4 shows a characteristic curve of casting time v. solids concentration when water glass is used as a deflocculant;

FIGS. 5 and 6 show particle size distribution curves similar to the ones in FIG. 1, for powders 3 and 4, respectively;

DETAILED DESCRIPTION OF A PREFERRED EMBODIMENT

Figure 1:
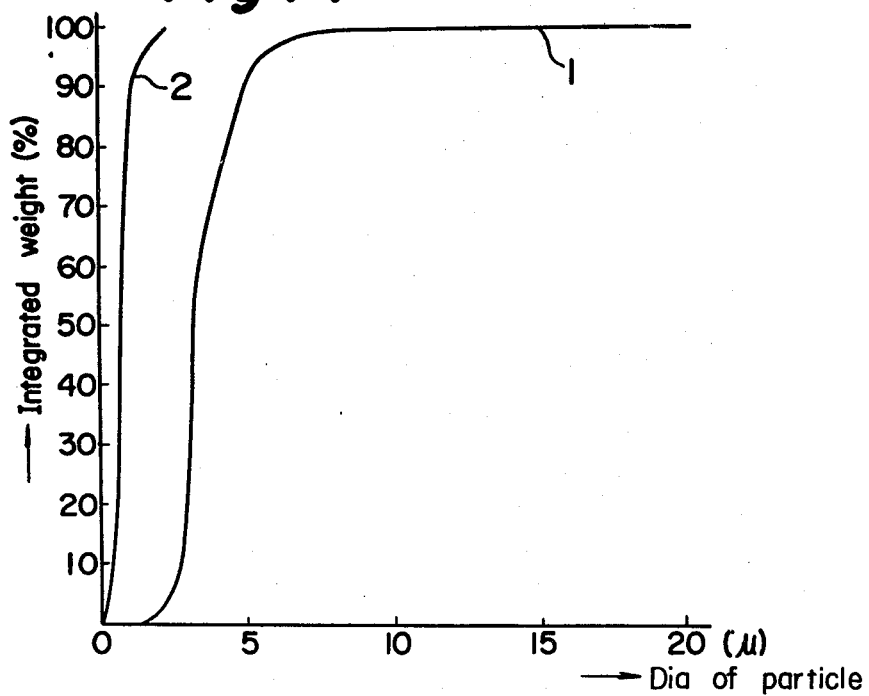
FIG. 1 shows the particle size distribution for powders 1 and 2.
Figure 1A:
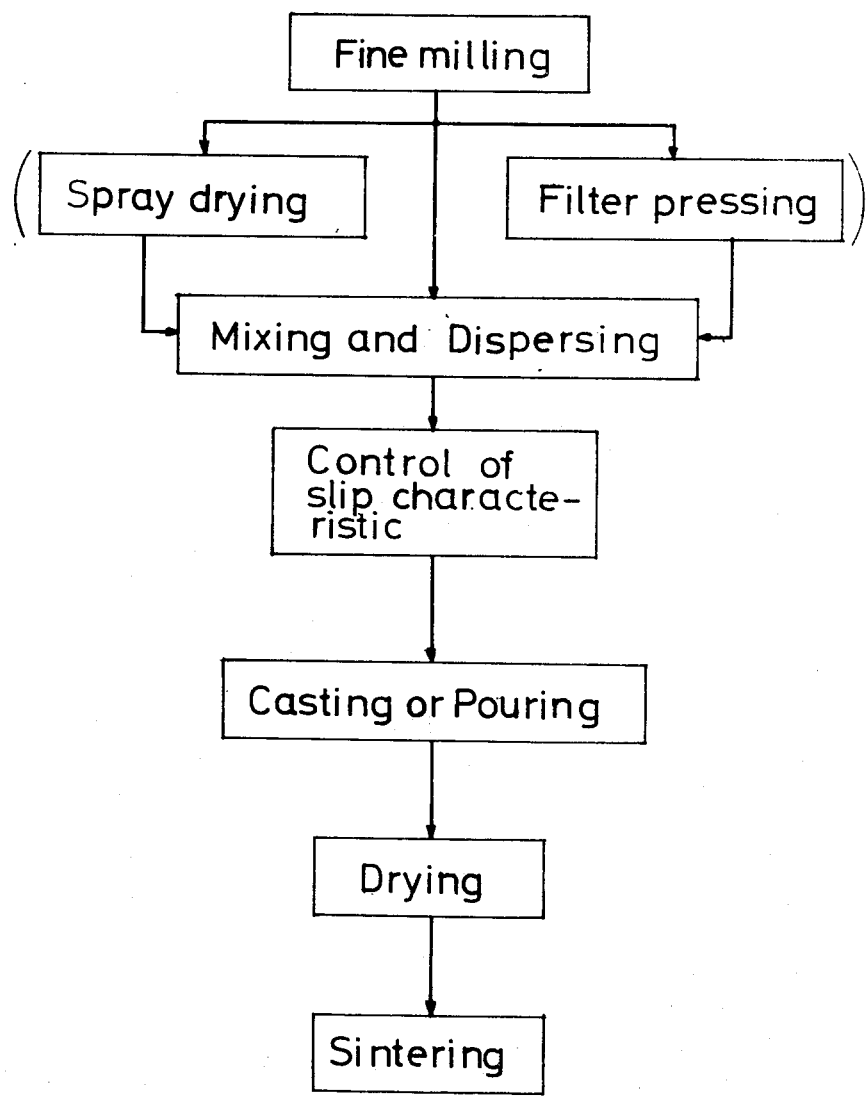
FIG. 1A is a flow diagram showing generally the method of the invention.

In accordance with the invention, it has been determined experimentally (as shown by the examples below) that the "soft" ferromagnetic ferrites can be effectively slip cast. Referring to FIG. 1A, the general steps of the process for slip casting the soft ferromagnetic ferrites is shown. The first step is designated "fine milling" and refers to when the powders of prepared ferromagnetic oxide or an oxide mixture are crushed and blended to produce a fine powder having a particle size distribution within the ranges discussed in greater detail below. After the blended powders have been either spray dried or filter pressed, an inorganic or organic dispersing agent is added, the mixture then being mixed with water to form a suspension or slip. The characteristics of the slip can be controlled by adjusting one or more of several variables such as the particle size distribution, solids concentration, specific gravity and pH. The adjustment of these and other variables are carried out until a slip with preferable characteristics is attained. The slip is then poured or cast into a mold formed of, for example, plaster of Paris and the water content of the slip is absorbed by capillary action into the mold to form the casting. The casting is then allowed to dry so that deformation or breakage will not occur when it is handled. The dried casting is then fired or sintered to complete the process.

The ferrites used in the inventive process are the soft ferromagnetic ferrites which can be expressed by the formula $MeO:Fe_2O_3$, where the molecular ratio of MeO to $Fe_2O_3$ is about 1:1. MeO represents oxidic compounds of, for example, Zn, Cu, Ni, Fe, Mg, Mn or YIG, as shown in the examples below.

It has been determined experimentally that the slip casting of the soft ferromagnetic ferrites is possible if the normally presintered and crushed powders are blended with fine particles having a diameter smaller than $2\mu$ or $3\ \mu$. However, it has also been found that too large a concentration of fine particles (those below $2\ \mu$ or $3\ \mu$) is not desirable, as will be discussed below in conjunction with FIG. 18. In addition, it has also been determined that the solids concentration of the suspension must be more than 50 percent, and that inorganic as well as organic materials can be used as deflocculants, although the latter gives much better results.

The following descriptions are examples of the inventive process.

EXAMPLE 1:

$Fe_3O_3$, ZnO and CuO were mixed in the ratio 6:2:2 by weight. The mixture was presintered at 900°C and then finely crushed in a ball mill for 10 hours. The resulting product is referred to as powder 1. The particle size distribution of powder 1 is shown in Table 1 and in FIG. 1 as the curve 1. FIG. 1 shows the integrated weight percent versus the diameter of the particles.

Powder 2 in Table 1 is a mixture of $Fe_2O_3$, AnO and CuO in the ratio 6:2:2 by weight, which were crushed but not presintered. The particle size distribution of powder 2 is also shown in Table 1 and in FIG. 1 as the curve 2.

Table 1

| Diameter of Particles Powder | Grain Size Distribution | | | Mean Diameter |
|---|---|---|---|---|
| | $0 - 2\ \mu$ | $2 - 5\ \mu$ | $5 - 20\ \mu$ | |
| No. 1 | 2% | 90% | 8% | $3.2\ \mu$ |
| No. 2 | 100% | 0% | 0% | $0.75\ \mu$ |

Table 1 shows that the maximum and minimum diameters of particles are about $20\mu$ and about $2\ \mu$, respectively. Powders 1 and 2 were mixed in the ratio shown in Table 2 and water was added to the mixture as a dispersant to adjust the solids concentration to 75 percent. Water glass (sodium silicate) was then introduced into the mixture to prepare the suspension or slip, and slip casting was carried out by pouring the slip into a plaster of Paris mold. In the following examples, all the casting is done in plaster of Paris molds, although other fluid absorbing molds having an effective capillary action are contemplated within the scope of the invention. It has been found that plaster of Paris is preferable when sharp detailed impressions must be formed on the casting.

Table 2

| Mixing Ratio and Characteristics of Slip-Casted Materials | | | |
|---|---|---|---|
| | Mixing Ratio (Weight %) | | |
| | A | B | C |
| Powder 1 | 100 | 95 | 90 |
| Powder 2 | 0 | 5 | 10 |
| Amount of Particles below $2\ \mu$ (%) | 2 | 6.9 | 11.8 |
| Characteristics | Plasticity is poor and cracks are easily brought about. Casting is quickly carried out but lamination appears. Surface state is not good, slip casting can not be carried out. | Plasticity is good and no cracks are found out. Spinnability is good. The surface is smooth. Slip casting can be carried out. | |

Table 2 shows that slip casting can be effectively accomplished if the slip contains more than 5 percent by weight of powder 2.

The term "spinnability" is used to describe the property of drawing out "yarn" from a substance such as concentrated milk when a rod is inserted in the milk and drawn out. The milk on the rod will drop in the form of yarn. This property is one factor in determining the characteristics of a slip.

The product C in the table 2 was compared with a product formed with the same ratio of powders 1 and 2 (powders 1:2 is 90:10), but produced by a conventional dry-pressing method. Table 3 shows the green densities of these two products and it shows also the bulk specific gravities and electro-magnetic properties after sintering at 1000°C.

Table 3

| | Comparison of Properties | |
|---|---|---|
| | Dry-Pressed Product (Pressure being 1 ton/cm.$^2$) | Slip-Cast Product |
| Density of Products after forming | 2.7 (g./cc.) | 2.8 (g./cc.) |
| Bulk Specific Gravity after sintering at 1000°C | 4.63 | 4.75 |
| Electro-Magnetic Properties $\mu_o$ | 420 | 450 |
| Properties tan $\delta/\mu_o$ | 2.0×10$^{-4}$ | 1.6×10$^{-4}$ |

In this table, $\mu o$ is the initial magnetic permeability and tan $\delta$ is the loss factor, at 1000 KHz. Table 3 shows that the density of the product made by the slip casting method of this invention is higher than that of the product made by the conventional dry-pressing method, before and after sintering. With respect to electro-magnetic properties, the former is significantly better than the latter.

Figure 2:
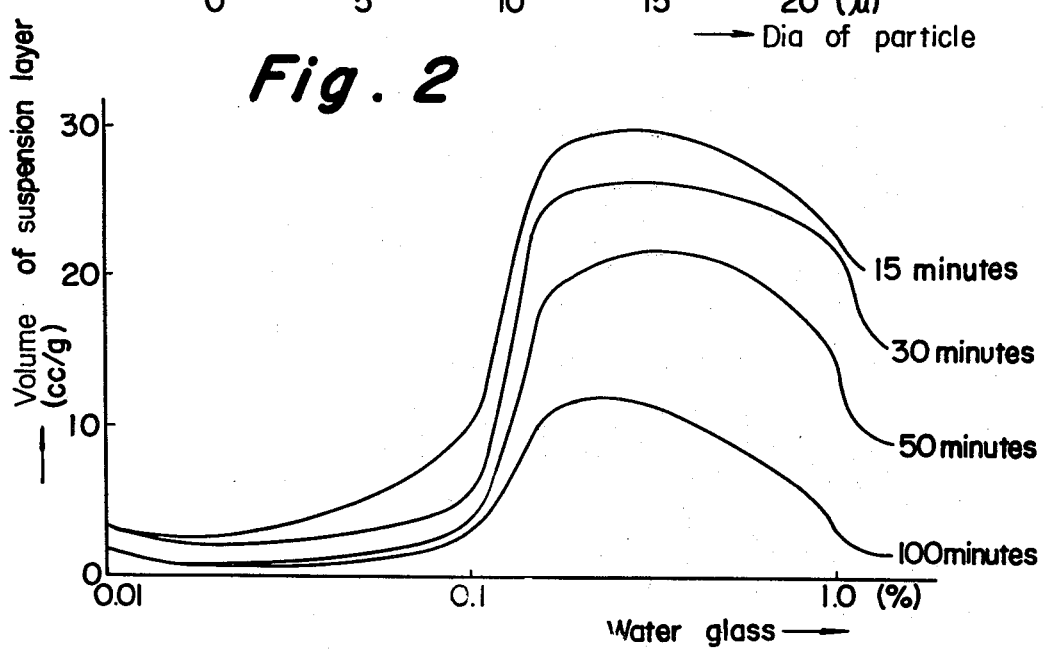
FIG. 2 shows the degree of dispersion of the solid particles in the solution when water glass is used as a deflocculant.

FIG. 2 shows the relation between the volume of the suspension layer (i.e. the degree of dispersion) and the amount of water glass (the deflocculant), where time is regarded as a parameter. In FIG. 2, the sample is the mixture C of Table 2.

FIG. 2 shows that good dispersion can be obtained if water glass is added more than 0.1 percent.

FIG. 3 shows the relation between the mechanical strength of the slip cast product (being dried at 60°C for 100 hrs., no water content) and the amount of water glass. For comparison, the mechanical strength of the dry-pressed product is also shown.

In FIG. 3, the ordinate axis denoted the bending strength (kg./cm.$^2$) and the abscissa axis the amount of water glass from 0 to 1 percent, and the points a, b, c and d show the typical values of the bending strength when 0.25 percent, 0.5 percent, 0.75 percent and 1.00 percent by weight of water glass was added, respectively. The arrow extending upward and downward at each point shows the distribution of the value of the bending strength. In FIG. 3, the point e shows the bending strength of the conventionally dry-pressed product produced under the pressure of 1.0 t./cm$^2$, and the arrow at this point also shows the distribution of the value of the bending strength.

FIG. 3 shows that the mechanical strength of the slip-cast product is much greater than that of the dry-pressed product (being pressed under the pressure of 1.0 t./cm.$^2$), if water glass is added from 0.25 to 1.0 percent by weight.

What FIGS. 2 and 3 teach us is that in order to obtain the sufficient mechanical strength of the Cu-Zn ferrite by slip casting, water glass should be added from 0.25 to 1.0 percent by weight. In addition, other soft ferrites can be slip cast as well as the Cu-Zn ferrite, as long as an appropriate amount of water glass is selected according to the quality, sintering temperature and particle size distribution of the blended ferrite powders.

FIG. 4 shows the relation between the casting rate and the solids concentration for mixture C of Table 2, water being used as the dispersant and 0.5 percent by weight of water glass being used as the deflocculant. FIG. 4 shows that if the solids concentration goes down below 50 percent, the casting time (which means the time required for casting 1 cm.) goes over 120 minutes, which is undesirable in view of efficiency of work and uniformity of the product. Therefore, the solids concentration should be kept above 50 percent.

EXAMPLE 2

The powder 1 of Example 1 was further crushed by means of wet-vibration mill for 5 hours, and the product is referred to as powder 3. Another powder was prepared in the same manner as powder 1, with the exception of pre-sintering at 1000°C and crushing in the ball mill for 20 hours, and is referred to as powder 4. The particle size distributions of these samples are shown in Table 4 and FIGS. 5 and 6.

Table 4

| | Particle Size Distribution | | | Mean Diameter |
|---|---|---|---|---|
| | 0 - 2 $\mu$ | 2 - 5 $\mu$ | 5 - 20 $\mu$ | |
| Powder 3 | 16 % | 81 % | 3 % | 2.3 $\mu$ |
| Powder 4 | 0 % | 16 % | 84 % | 7.0 $\mu$ |

As shown in Table 4, the maximum diameter of the particles is 20 $\mu$.

Powders 1, 3 and 4 were blended as shown in Table 5 and samples A', B', C', D' and E' were obtained. The solids concentration and added amount of water galss of these samples A', B', C', D' and E' were adjusted to be 70 percent and 0.5 percent by weight, respectively, and then the experiments of slip casting were carried out.

Table 5

| | Mixing Ratio (weight %) | | | | |
|---|---|---|---|---|---|
| | A' | B' | C' | D' | E' |
| Powder 1 | 0 | 15 | 15 | 100 | 0 |
| Powder 3 | 100 | 85 | 70 | 0 | 0 |
| Powder 4 | 0 | 0 | 15 | 0 | 100 |
| Contained Amount of Particles less than 2 $\mu$ | 16 | 13.9 | 11.5 | 2 | 0 |

According to the results of the experiments, samples A', B' and C' could be slip cast, but in the case of the samples D' and E', cracks and laminations appeared and slip casting could not be accomplished.

DISCUSSION OF EXAMPLES 1 AND 2

What examples 1 and 2 teach us is that the soft ferromagnetic ferrites can be slip cast if the maximum size of the ferrite particles is 20$\mu$ and at least about 5 percent of the ferrite particles are smaller than about 1/10 of the maximum size, by weight. In addition, the solids concentration of the slip should be more than 50 percent, and inorganic deflocculants such as water glass can be used. When the slip cast ferromagnetic ferrites are sintered, products obtained show electro-magnetic characteristics significantly better than those of conventionally dry-pressed ferrites.

As shown above, in the slip casting of the ferrite core, water glass can effectively be used as deflocculant, but since the principal components of water glass are $Na_2O$ and $SiO_2$, the electro-magnetic properties sometimes deteriorate by the addition of the defloculant. It is thought that this is due to the types of ferrite materials that were used.

In addition, materials such as metal oxides have poor plasticity, hence the particle size distribution should be strictly controlled as mentioned above if slip casting is to be accomplished. Therefore, the study of crushing methods and blending of fine particles is required.

In order to provide a better casting and make the process more efficient, organic materials such as ammonium alginate and triethylamine were added to the blended ferrite powder particles. Ammonium alginate functioned as a protective colloid, deflocculant and binder, while trientylamine functioned as a deflocculant and controlled the pH of the suspension.

In regard to the above-mentioned techniques, the detailed explanations will be given in the following paragraphs in addordance with the following examples.

Figure 7:
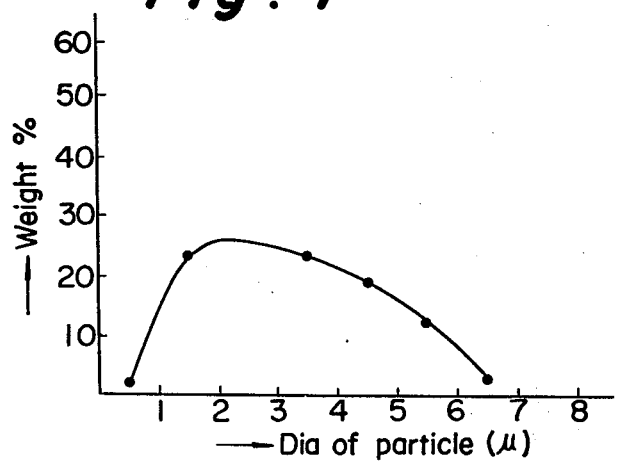
FIG. 7 shows the particle size distribution of the Ni-Zn ferrite powder used in example 3.

EXAMPLE 3:

FIG. 7 shows the particle size distribution of Ni-Zn ferrite powder which contains 4 percent by weight NiO, 33 percent by weight $Fe_2O_3$, 50 percent by weight $ZnFe_2O_4$, 2 percent by weight CuO and 11 percent by weight MgO. Ferrite powder of the above composition which was not presintered was placed in a ball mill for 24 hours and particles smaller than 2 $\mu$ were obtained. A presintered powder having particles of larger than 2 $\mu$ in diameter was then prepared and blended with the smaller particles. The particle size distribution is shown in FIG. 7 and consists of 23 percent by weight of particles of 0 − 2 $\mu$, 63 percent by weight of particles of 2 $\mu$ − 5 $\mu$ and 14 percent by weight of particles of 5 $\mu$ − 20 $\mu$.

The blended powders were mixed along with 0.4 percent by weight of triethylamine and 0.15 percent by weight of ammonium alginate and the solids concentration was adjusted to 76 percent by weight. The mixture was stirred for two hours.

The proportions of this slip were as follows:

| | |
|---|---|
| Specific gravity | 2.45 |
| Relative viscosity | 7.35 |
| pH | 10.20 |

The relative viscosity is defined as follows:

$$\text{Relative viscosity} = \frac{\text{Efflux time of slip}}{(\text{Efflux time of distilled water}) \times (\text{Specific gravity of slip})}$$

Figure 8:
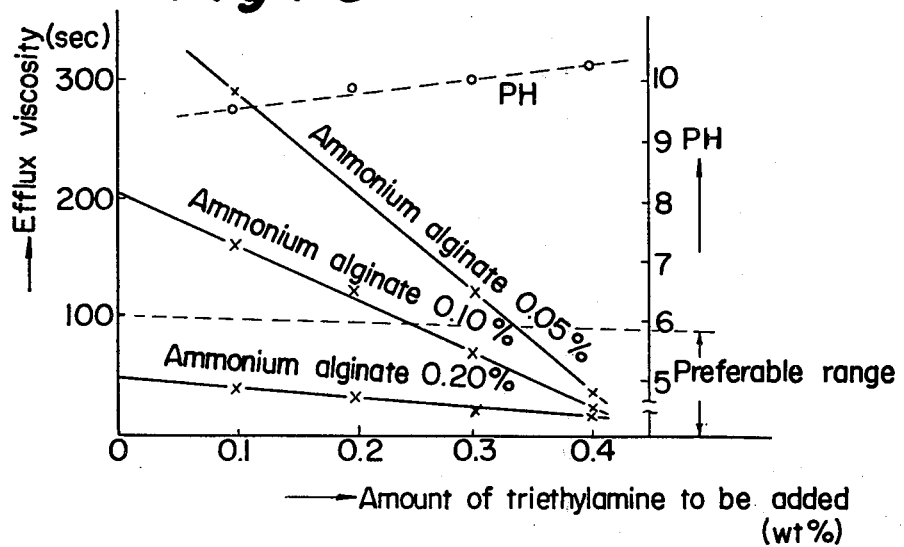
FIGS. 8 and 9 show the slip characteristics of the Ni-Zn ferrite powder in example 3 with an added organic deflocculant.
Figure 9:
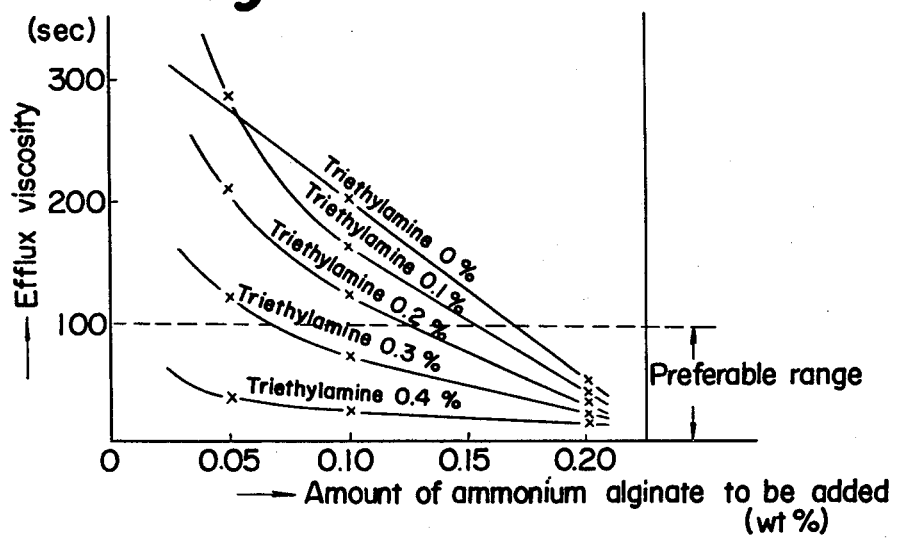

FIGS. 8 and 9 show the relation between the added amount of triethylamine or ammonium alginate, and the efflux viscosity and pH.

FIG. 8 uses the amount of ammonium alginate to be added as a parameter, and shows that the pH value of the slip is more or less affected by the amount of triethylamine and the viscosity of slip is affected by the amount of triethylamine when the amount of ammonium alginate is relatively small.

FIG. 9 uses the amount of triethylamine as a parameter, and shows that the viscosity of the slip is affected by the amount of ammonium alginate when the amount of triethylamine is relatively small.

In FIGS. 8 and 9, the viscosity of the slip required for slip casting, i.e. the preferable range of viscosity, is the range below the dotted line.

In carrying out the slip casting it is necessary to select the slip state according to the shape and thickness of the pressed product.

Therefore, it is difficult to determine what is desired for the slip properties in general, but the inventors of the present invention succeeded in carrying out the slip casting by obtaining a slip of appropriate spinnability and excellent fluidity within the range of properties shown in FIGS. 8 and 9.

Figure 10:
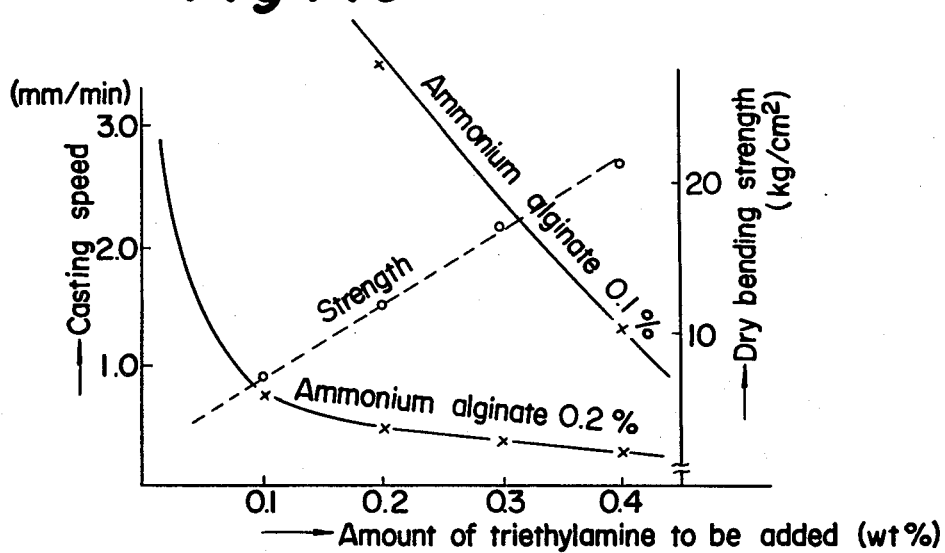
FIGS. 10 and 11 show the casting characteristics for the slip in FIGS. 8 and 9.
Figure 11:
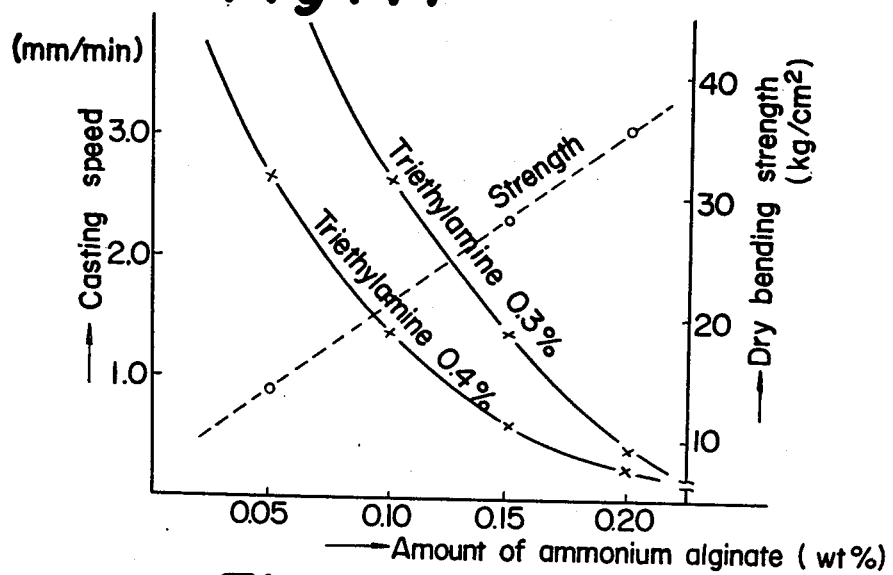

FIGS. 10 and 11 are diagrams showing the casting speed and dry bending strength when the amounts of triethylamine and ammonium alginate are varied.

In FIG. 10, the amount of ammonium alginate is shown as a parameter, and FIG. 11 shows the amount of triethylamine as a parameter.

FIG. 11 shows that the casting speed can be controlled by the amount of ammonium alginate, and that it is possible to increase the shaping strength (kg./cm.$^2$) by the amount of ammonium alginate.

However, in the slip prepared by adding ammonium alginate or triethylamine, individually, the deflocculation is insufficient and fluidity is poor, and the slip cannot slip cast. However, it was found that the slip could be used for vibration casting.

When ammonium alginate and triethylamine were used together, and the amount of each deflocculant was less than 0.05 percent by weight, the deflocculation was insufficient. In addition, although it is not shown in FIGS. 10 and 11, when the amount of ammonium alginate and triethylamine together went beyond about 2 percent to 3 percent by weight, the slip could not be cast effectively.

Thus, in order to form a good casting, the slip can be obtained by selecting appropriate amounts of the two within specified ranges and coemploying the two. These ranges have been found to be about 0.05 to 0.8 percent by weight of ammonium alginate and about 0.05 to 0.7 percent by weight of triethylamine.

Under the above-mentioned conditions, a ferrite core was made and sintered at 1200°C for 2 hours. The electro-magnetic properties of the ferrite core are shown in Table 6.

For the purpose of comparison, the properties of the conventionally dry pressed and sintered core and those of another example of this invention in which an inorganic deflocculant such as water glass was used are also given in Table 6.

Table 6

| Properties | Dry Pressing | The Present Invention | |
|---|---|---|---|
| | | Inorganic deflocculant | Organic deflocculant |
| $\mu_0$ | 565 | 590 | 670 |
| Q | 75 | 75 | 73 |
| Bms (Gauss) | 2400 | 2450 | 2490 |
| Hc (Oer) | 0.30 | 0.20 | 0.25 |
| $\rho$ (×10$^6$Ω−cm.) | 100 | 7 | 105 |
| d (g./cc.$^3$) | 4.50 | 4.55 | 4.55 |

In Table 6, $\mu_0$ is the initial magnetic permeability and Q is quality factor, at 150 KHz; Bms and Hc are respectively the residual magnetism and the coercive force after saturation; $\rho$ is the specific resistance; and $d$ is the density.

The properties shown in the table are the properties when slip casting is done in such a manner that the green density of the product becomes equal to that of the dry-pressed one, i.e. 2.4 g./cm.$^3$, and both are sintered at 1200°C.

As is apparent from the Table 6, the properties of both products obtained by the inventive slip casting process are better than that produced by the conventional dry-pressing method, and the properties of the product obtained by using organic deflocculants are generally better than those of the products obtained by using the inorganic deflocculant (water glass).

Figure 12:
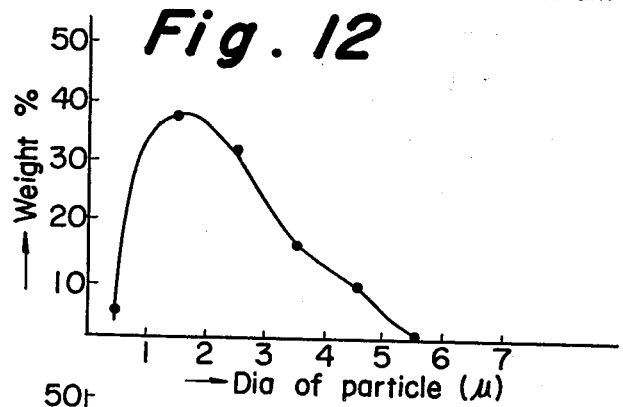
FIGS. 12–16 show particle size distribution curves for examples 4–8, respectively.

EXAMPLE 4:

The ferrite powder composed of NiO 12 percent, ZnO 19 percent, Fe$_2$O$_3$ 65 percent and CuO 4 percent, by weight, was selected, and the raw materials were mixed, pressed and presintered at 950°C for 2 hours. The resultant was then finely crushed in a ball mill for 20 hours. The particles obtained were smaller than 2 $\mu$. A powder of same composition made up of particles larger than 2 $\mu$ was formed by varying the crushing time. The powders were blended. The blend consisted of 42 percent by weight of particles of 0 – 2 $\mu$, 57 percent by weight of particles of 2 $\mu$ – 5 $\mu$ and 1 percent by weight of particles of 5 $\mu$ – 20 $\mu$, as shown in FIG. 12.

Added to the powder were 0.6 percent by weight of triethylamine and 0.1 percent by weight of ammonium alginate, and the solids concentration was adjusted to 75 percent by weight.

With regard to the slip properties for this example, the specific gravity was 2.45, the relative viscosity 7.35 and the pH 10.8.

The thus-prepared mixture was slip cast and sintered at 1250°C for 2 hours. The electro-magnetic properties of the product are shown in Table 7.

In Table 7, the properties of a product of the same composition as above, prepared in accordance with the conventional dry-pressing method and sintered at 1250° for 2 hours are also shown.

In this table, $\mu$o is the initial magnetic permeability and Q is quality factor at 150 KHz; Bms and Hc are respectively the residual magnetism and the coercive force after saturation; $\rho$ is the specific resistance; and $d$ is the density.

Table 7

| Properties | Method for pressing | |
|---|---|---|
| | Dry pressing | Present invention |
| $\mu$o | 200 | 240 |
| Bms (Gauss) | 3150 | 3260 |
| Hc (Oe) | 1.0 | 0.8 |
| $\rho$ (× 10$^6$Ω–cm.) | 4830 | 5080 |
| d (g./cm.$^2$) | 4.60 | 4.65 |
| Q | 180 | 175 |

As is apparent from Table 7, better properties were attained by the slip cast product in accordance with the present invention.

Figure 13:
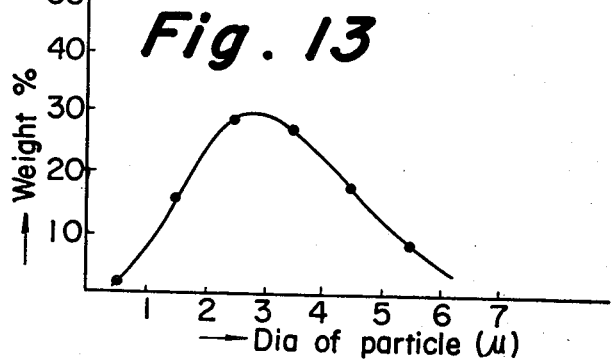

EXAMPLE 5:

The Mn-Mg ferrite composed of 25 percent by weight of MnO, 10 percent by weight of MgO and 65% by weight of Fe$_2$O$_3$ was selected. The raw materials were sufficiently mixed and presintered at 900° for three hours. The mass was finely crushed in a ball mill for 20 hours. The powder thus obtained has a particle size of less than 2$\mu$. To obtain the powder having particles of over 2$\mu$, the crushing time was varied, and the two powders were blended. The blend consisted of 17 percent by weight of particles of 0 – 2$\mu$, 74 percent by wight of particles of 2$\mu$ – 5$\mu$, and 9% by weight of particles of 5$\mu$ – 20$\mu$, as shown in FIG. 13.

Added to the blend were 0.5 percent by weight of triethylamine and 0.2 percent by weight of ammonium alginate. The solids concentration was adjusted to 75 percent by weight.

With regard to the slip properties in this example, specific gravity was 2.05, relative viscosity 3.34, and pH 10.8.

The mixture was slip cast and sintered at 1400°C for three hours. The electro-magnetic properties (the properties in microwave region) are shown in Table 8.

The properties of a product with a similar composition prepared in accordance with the conventional dry-pressing method and sintered at 1400°C for three hours are also shown in Table 8.

Table 8

| Properties | Properties Method for pressing | Method for |
|---|---|---|
| | Dry pressing | Slip casting |
| 4$\pi$M (Gauss) | 2300 | 2490 |
| 4$\pi$Ms (Gauss) | 2700 | 2920 |
| H (Oe) | 300 | 265 |
| $\epsilon$ | 12.0 | 12.3 |
| tan $\delta$ | 3.1×10$^{-3}$ | 2.9×10$^{-3}$ |
| d (g./cm.$^3$) | 4.42 | 4.48 |

In Table 8, 4$\pi$M is the residual magnetic flux density and 4$\pi$Ms is the saturated magnetic flux density.

$\Delta$H is the half width of ferromagnetic resonance at 9000 MHz, $\epsilon$ the dielectric constant at 9000 MHz, tan $\delta$ the loss factor at 9000 MHz, and d the density (g./cm.$^3$) after sintering.

Table 8 shows that the properties of the product prepared in accordance with the present invention are excellent when compared to the product prepared by the conventional dry-pressing method.

Figure 14:
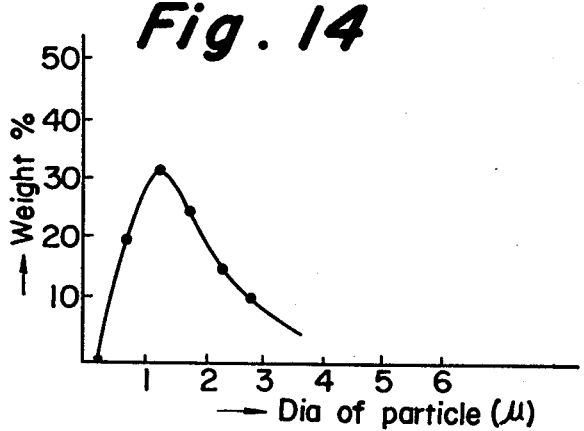

EXAMPLE 6:

Mn-Zn ferrite composed of 16 percent by weight of MnO, 14 percent by weight of ZnO, and 70 percent by weight of Fe$_2$O$_3$ was selected. The raw materials were mixed and presintered at 860°C for 2 hours. The mass was finely crushed by a ball mill for 32 hours and the powder thus obtained has a particle size of less than 2$\mu$. Powder having particles larger than 2$\mu$ was obtrained by varying the crushing time. The powders were blended. The blend consisted of 76 percent by weight of particles of 0 – 2$\mu$ and 24 percent by weight of particles of 2$\mu$ – 5$\mu$, as shown in FIG. 14.

Added to the powder were 0.6 percent by weight of triethylamine and 0.3 percent by weight of ammonium alginate. The solids concentration was adjusted to 75 percent by weight.

With regard to the slip properties in this example, the specific gravity was 2.40, the relative viscosity 12.0, and the pH 10.2.

The above prepared mixture was slip cast and sintered at 1300°C for three hours. The electro-magnetic properties of the product are shown in Table 9.

In Table 9, the properties of a product of the same composition prepared by the conventional dry-pressing method and sintered at 1400°C for three hours are also given.

Table 9

| Method for pressing Properties | Properties Dry pressing | Slip casting |
|---|---|---|
| μo | 3399 | 4000 |
| Q | 70 | 80 |
| Bms (Gauss) | 4100 | 4200 |
| Br (Gauss) | 1000 | 1050 |
| d (gr/cm³) | 4.92 | 4.95 |
| Hems (Oe) | 0.10 | 0.10 |

In Table 9, μo is the initial magentic permeability, and Q is the quality factor, at 100 KHz; Bms the saturated magnetic flux density, Br the residual magnetic flux density, Hc the coercive force, and d the density (g./cm.³) after sintering.

Table 9 shows that the properties of the product of the present invention are excellent when compared to the properties of the product prepared by the conventional dry-pressing method.

Figure 15:
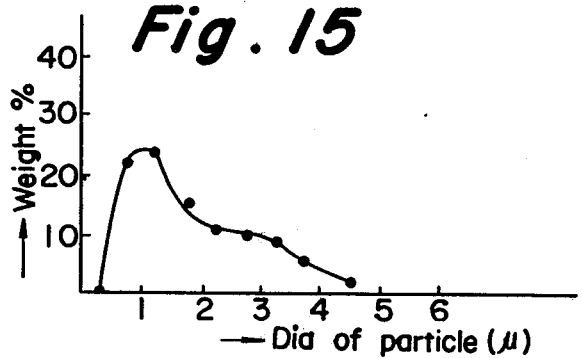

EXMAPLE 7:

Mn-Zn ferrite composed of 13 percent by weight of MnO, 18 percent by weight of ZnO, and 69 percent by weight of $Fe_2O_3$ was selected. The raw materials were mixed and presintered at 860°C for two hours. The mass was finely crushed by using a ball mill for 16 hours and the powder obtained had a particle size of less than 2μ. Powder having particles larger than 2μ was obtained by varying the crushing time. The powders were blended. The blend consisted of 62 percent by weight of particles of 0 – 2μ and 38 percent by weight of particles of 2μ – 5μ, as shown in FIG. 15.

Added to the powder were 0.6 percent by weight of triethylamine and 0.3 percent by weight of ammonium alginate. The solids concentration was adjusted to 73 percent by weight.

With regard to the slip properties in this example, the specific gravity was 2.40, relative viscosity 12.0, and pH 10.5.

The slip was slip cast and sintered at 1360°C for 3 hours.

The electro-magentic properties of thus obtained product are shown in Table 10.

In Table 10 the properties of a product of the same composition as above and prepared by the conventional dry pressing method and sintered at 1360°C for 3 hours are also shown.

Table 10

| Properties | Dry pressing | Slip casting |
|---|---|---|
| μo | 7800 | 8600 |
| Q | 21 | 20 |
| Bms (Gauss) | 3500 | 3610 |
| Br (Gauss) | 700 | 720 |
| Hc (Oe) | 0.1 | 0.09 |
| d (g./cm.³) | 4.9 | 4.94 |

In Table 10, μo is the initial magnetic permeability and Q is the quality factor, at 100 KHz; Bms the saturated magnetic flux density, Br the residual magnetic flux density, Hc the coercive force, and d the density (g./cm.³).

Table 10 shows that the properties of the product obtained in accordance with the present invention are excellent when compared to the properties of the product prepared by the conventional dry pressing method.

EXAMPLE 8:

The following are the explanations about YIG magnetic material (Yttrium-iron garnet).

Figure 16:
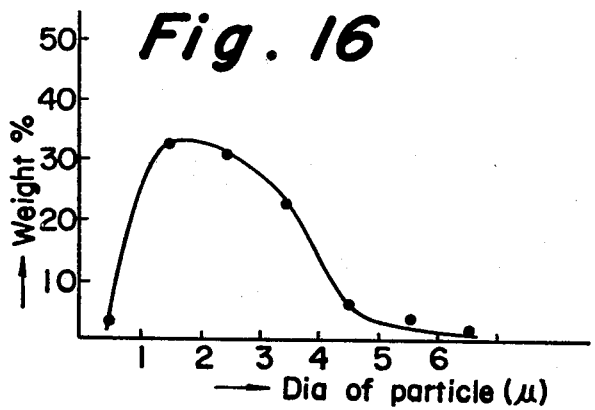

YIG ferrite composed of 47.2 percent by weight of $Y_2O_3$, 4.6 percent by weight of $Al_2O_3$ and 48.2 percent by weight of $Fe_2O_3$ was selected. The selected raw materials were mixed and presintered at 1250°C for three hours, and then finely crushed by using a ball mill for 20 hours. The powder thus obtained had a particle size smaller than 2 μ. Then, the crushing time was varied and a powder of the same composition with particles larger than 2 μ was obtained. The powders were blended. The blend consisted of 35 percent by weight of particles of 0 – 2 μ, 59 percent by weight of particles of 2 μ – 5 μ and 6 percent by weight of particles of 5 μ – 20 μ, as shown in FIG. 16.

Added to the powder were 0.6 percent by weight of triethylamine and 0.2 percent by weight of ammonium alginate. The solids concentration was adjusted to 77 percent by weight.

With regard to the slip properties in this case, the specific gravity was 2.55, relative viscosity 9.30 and pH 11.0.

The mixture was slip cast and sintered at 1450°C for 5 hours. The microwave properties of the casting are shown in Table 11.

In Table 11, the properties of a product of the same composition as above, prepared by the conventional dry pressing method and sintered at 1450°C for 5 hours, are also shown.

Table 11

|  | Dry pressing | Drain casting |
|---|---|---|
| 4πM (Gauss) | 665 | 740 |
| 4πMs (Gauss) | 880 | 990 |
| H (Oe) | 80 | 55 |
| ε | 14.1 | 14.3 |
| tan δ | 3.0×10⁻³ | 2.95×10⁻³ |
| d (g./cm.³) | 4.93 | 5.04 |

In Table 11, 4πM is the saturated magnetic flux density, ΔH is the half-width of ferromagnetic resonance and ε is the dielectric constant and tan δ is the dielectric loss factor, at 1000 MHz; and d is the density.

Table 11 shows that the properties of the product obtained in accordance with the present invention are excellent when compared with the product prepared by the conventional method.

Figure 17:
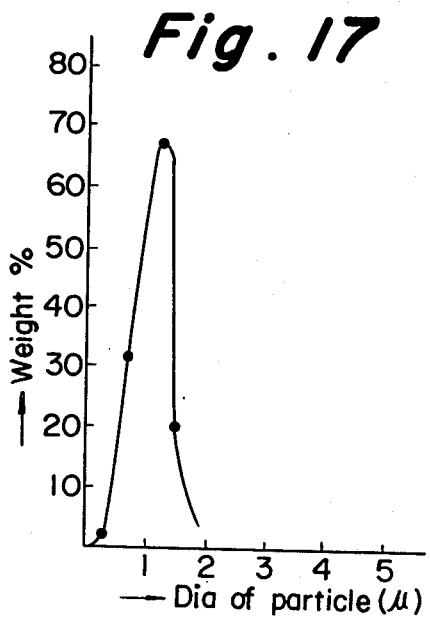
FIG. 17A shows a product formed according to example 9.
FIG. 17B shows the density characteristics of products formed according to example 9.
FIG. 17C shows the product in FIG. 17A in another view

EXAMPLE 10:

The slip was prepared identical to the one in Example 3 and poured into the plaster of Paris mold to obtain a casting of the form shown in FIG. 17A and 17C. The casting was sintered under the same sintering conditions as in Example 3.

The densities of the casting at the respective positions 1, 2, 3, 4, 5 and 6, as shown in FIG. 17A and 17C, were measured.

A casting of the same composition and form as shown in FIG. 17A and 17C, was prepared in accordance with the conventional dry press method and sintered under the same conditions. The densities at the same respective portions were measured.

The characteristics of the densities are given in Table 12.

The numbers on the left column, i.e. 1, 2, 3, 4, 5 and 6, show the measured positions.

Table 12

|   | Dry process | Slip casting |
|---|---|---|
| 1 | 4.380 | 4.602 |
| 2 | 4.420 | 4.609 |
| 3 | 4.448 | 4.602 |
| 4 | 4.461 | 4.611 |
| 5 | 4.430 | 4.604 |
| 6 | 4.389 | 4.606 |

FIG. 17B shows the density characteristics obtained by plotting the measured values of Table 12.

As is apparent from FIG. 17B, it was discovered that the ferrite which was cast and sintered in accordance with slip casting methods has a higher overall density than that of the casting prepared by the dry-pressing method, and that the respective densities of the slip cast casting are much more homogeneous.

OTHER EXAMPLES:

Additional slips were prepared by methods similar to the ones in the above examples, and various kinds of materials having different particle size distributions were used. It was found that excellent slip casting resulted. Table 13 shows examples of the prepared slips.

Triethylamine and ammonium alginate were added and the concentration of solids was accordingly adjusted.

The mixing ratios given below are all weight percent.

Table 13

|  | Ammonium alginate | Triethyl-amine | Solids concentration |
|---|---|---|---|
| Mn-Zn ferrite | 0.6% | 0.8% | 80% |
| Mn-Mg ferrite | 0.2% | 0.8% | 65% |
| YIG magnetic material | 0.4% | 0.4% | 80% |

As shown by the above examples, there are a number of variables that affect the plasticity of the slip. When an organic deflocculant was used, it was found that a predetermined amount of samll colloidal particles must be contained in the powder. This, on the other hand, made it difficult to obtain the needed plasticity, so slip casting seemed impossible.

In addition, when an inorganic deflocculant was used, as described in Examples 1 and 2, it was found that an important factor was to select appropriate materials and the proper particle size distribution. No matter what kind of deflocculant is used, either organic or inorganic, it was found to be necessary to select a particle size distribution close to the most compact state. However, it was also found that a certain minimum amount of particles must be larger than about $2\mu$ in diameter.

In order to attain the most compact state and still have enough particles larger and smaller than $2\mu$ in diameter, powders with different particle sizes had to be blended. Simply crushing the material for a predetermined length of time was not enough.

Figure 18:
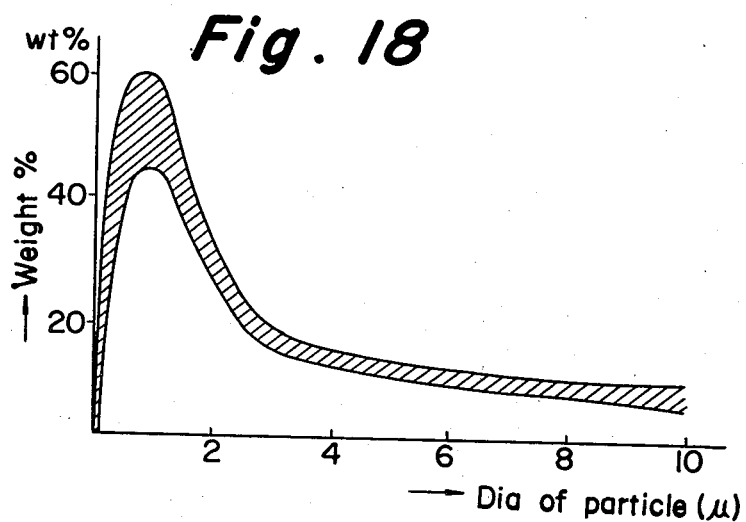
FIG. 18 shows particle size distribution curves for the explanation of maximum density.

FIG. 18 shows the range of particle size distribution of the most compact state when the maximum diameter of particle is $10\mu$ (the range being shown by the hatching lines). It is very difficult to select the particle size distribution close to the most compact state, as is apparent from the actual particle size distributions shown in FIGS. 7, 17, and 12–16. Although a minimum amount of fine particles is essential, too many fine particles will not work. If too many fine particles are in the slip, the slurry will decrease in density and more deflocculant will have to be added. However, an acceptable minimum amount of fine particles will improve plasticity. Conversely, it will be possible to carry out slip casting satisfactorily with a smaller amount of fine particles if the material has high plasticity.

However, as will be discussed below, for the soft ferromagnetic ferrites certain workable parameters for particle size distribution have been discovered.

The foregoing examples have illustrated various particle size distributions that have been found to result in the successful slip casting of the soft ferromagnetic ferrites. The three size ranges used in Tables 1 and 4 above $(0 - 2\ \mu, 2\ \mu - 5\ \mu$, and $5\ \mu - 20\ \mu)$ have been found to be a convenient breakdown for reflecting parameters for particle size distributions that can be used to achieve good results. The workable parameters for each range can be drawn from Examples 1–8, as shown below in Table 14.

Table 14

|  | Particle size distribution | | |
|---|---|---|---|
|  | 0–2 $\mu$ | 2–5 $\mu$ | 5–20 $\mu$ |
| Powder B of Example 1 | 6.9 | 85.5 | 7.6 |
| Powder C of Example 1 | 11.8 | 81.0 | 7.2 |
| Powder A' of Example 2 | 16.0 | 81.0 | 3.0 |
| Powder B' of Example 2 | 13.9 | 82.4 | 3.8 |
| Powder C' of Example 2 | 11.5 | 72.6 | 15.9 |
| Example 3 (FIG. 7) | 23.9 | 63.0 | 14.0 |
| Example 4 (FIG. 12) | 42.0 | 57.0 | 1.0 |
| Example 5 (FIG. 13) | 17.0 | 74.0 | 9.0 |
| Example 6 (FIG. 14) | 76.0 | 24.0 | 0 |
| Example 7 (FIG. 15) | 62.0 | 38.0 | 0 |
| Example 8 (FIG. 16) | 35.0 | 59.0 | 6.0 |

The particle size distributions shown in Table 14 can be summarized as follows:

Table 15

| 1–2 $\mu$ | 6.9–76 weight % |
|---|---|
| 2–5 $\mu$ | 85.5–24.0 weight % |
| 5–20 $\mu$ | 0–15.9 weight % |

These parameters may be changed somewhat by taking into consideration the technical problems involved in preparation of the slip. More specifically, the particle size distribution ranges may vary depending upon whether the ferrites are subjected to presintering, the time involved in grinding the ferrites (this may be a problem from the economical viewpoint) and other factors relating to grinding and the amounts of deflocculant and protective colloid used. This latter point is discussed in more detail below.

Thus, general limitations on the particle size distribution ranges which achieve good results in the slip casting of ferromagnetic ferrites can be determined from the above variables. These ranges are as follows:

Table 16

| 0–2 $\mu$ | 5–70 weight % |
|---|---|
| 2–5 $\mu$ | 90–20 weight % |
| 5–20 $\mu$ | 0–10 weight % |

These figures show that aside from having a certain minimum amount of particles in the 0–2 $\mu$ range, at least 30 percent of the particles must be larger than 2 $\mu$. This 30 percent could all be in the 2 $\mu$ – 5 $\mu$ range, or 10 percent of the particles could be in the 5 $\mu$ – 20 $\mu$ range.

It has further been found that to make up for the imperfectness of the particle size distribution, even within the optimum ranges, an additive having the property of a protective colloid is needed.

When the above mentioned inorganic deflocculant is used, it is necessary strictly to select the particle size distribution as mentioned above.

The additive having colloidal properties is generally called a protective colloid, and this should preferably have the properties of deflocculant, binder and lubricant.

The inventors of the present invention carried out various kinds of experiments from this starting point and found out the fact that ammonium alginate has the above-mentioned properties and can be used satisfactorily.

On the other hand, it is possible to facilitate the slip casting of oxide powders having different specific gravities with various kinds of particle size distributions by taking into consideration the molecular weight of ammonium alginate, degree of polymerization, the degree of substitution, and the amount of ammonium alginate to be added.

In addition to the above, ammonium alginate is an organic material, and it is perfectly decomposed by sintering, and therefore there is no possibility that the electro-magnetic properties of the ferrite would deteriorate.

Other organic materials such as lignin, fumic acid, tannic acid, gallic acid, starch, dextrin and polyethylene glycol can also be used and were found to have effects similar to ammonium alginate. When these other materials were used, it was possible to obtain excellent slips and to carry out the slip casting.

Triethylamine ($c_6H_{15}N$) is a liquid which is alkaline and has the smell of ammonia, and is an organic deflocculant which was found to control the pH value of slip as far as about 12. However, as illustrated in the foregoing examples the pH of the suspension can range from 10.2 (Example 6) to 11.0 (Example 8). Thus, the optimum range can be said to be from about 10 to 11.

When triethylamine was coemployed with an organic protective colloid such as ammonium alginate, it was found to give excellent solids concentration to the oxide powders such as the soft ferromagnetic ferrites which have low plasticity, so that slip casting can be accomplished.

When other organic materials such as pyridine, polyvinylamine, piperidine, tetramethyl-ammonium, hydroxide, ethylamine, propylamine, amylamine and butylamine were used they were found to have essentially the same effects as triethylamine, making it possible to carry out excellent slip casting.

In accordance with the present invention it is possible to carry out slip casting by appropriately selecting (1) the particle size distribution and blending materials to prepare the powder, (2) the deflocculant, (3) the solids concentration, (4) the specific gravity, and (5) pH, as mentioned above.

We claim:

1. A method for slip casting soft ferrite material, comprising the steps of: (1) forming a suspension by suspending in an aqueous solution a soft ferrite powder in an amount of 65–80 percent by weight, the ferrite powder having the formula of $MeO:Fe_2O_3$, the molecular ratio of MeO to $Fe_2O_3$ being about 1:1, MeO being a oxide selected from the group consisting of MnO, MgO, NiO, ZnO and CuO and having a particle size distribution as follows:

| particle distribution | wt. % |
| --- | --- |
| less than 2 microns | 6.9 – 70.0 |
| 2 – 5 microns | 90.0 – 20.0 |
| 5 – 20 microns | less than 10.0 | the aqueous solution including an organic dispersing agent having properties of deflocculant, binder and lubricant in an amount greater than 0.05 percent by weight of the ferrite powder; (2) introducing the suspension into a water-absorbing mold to form a wet casting; (3) dehydrating the casting; (4) sintering the casting.

2. The invention in claim 1, wherein the step of suspending includes suspending with an organic dispersing agent made up of ammonium alginate in the amount of 0.05 percent to 0.8 percent by weight of the solution and triethylamine in the amount of 0.05 to 0.7 percent by weight of the solution.

* * * * *

UNITED STATES PATENT OFFICE
CERTIFICATE OF CORRECTION

Patent No. 3,917,778        Dated November 4, 1975

Inventor(s) YOICHI SHIRAKI, SHOICHI WAKABAYASHI, MITSUNOBU YOKOYAMA, ISAO YOKOYAMA, SHIGEJI SUGAHARA, SATOSHI OGASAWARA It is certified that error appears in the above-identified patent and that said Letters Patent are hereby corrected as shown below:

Column 2, line 22, after "weight;" insert -- and no more than about 3.0% by weight; --.

Column 3, line 23, after "9;" delete "and".

Column 3, line 25, after "view" insert -- ; and --.

Column 4, line 13, "$Fe_3O_3$" should read -- $Fe_2O_3$ --.

Column 4, line 20, "AnO" should read -- ZnO --.

Column 5, table 3, line 21, "2.7(g./cc.)" should read -- 2.7($g/cm^3$) -- and "2.8(g./cc.)" should read -- 2.8($g/cm^3$) --.

Column 5, line 28, "μo" should read -- $\mu_o$ --.

Column 6, line 38, "galss" should read -- glass --.

Column 7, line 22, "trientylamine" should read -- triethylamine --.

Column 8, table 6, around line 65, "d(g./cc.$^3$)" should read -- d(g./$cm^3$) --.

Column 8, table 6, around line 60, "μo" should read -- $\mu_o$ --.

Column 8, line 66, "μo" should read -- $\mu_o$ --.

Column 9, line 45, "μo" should read -- $\mu_o$ --.

Column 9, table 7, around line 55 "μo" should read -- $\mu_o$ -- and around line 58, "d(g./cm.$^2$)" should read -- d(g./$cm^3$) --.

UNITED STATES PATENT OFFICE
CERTIFICATE OF CORRECTION

Patent No. 3,917,778  Dated November 4, 1975

Inventor(s) YOICHI SHIRAKI, SHOICHI WAKABAYASHI, MITSUNOBU YOKOYAMA, ISAO YOKOYAMA, SHIEGEJI SUGAHARA, SATOSHI OGASAWARA It is certified that error appears in the above-identified patent and that said Letters Patent are hereby corrected as shown below:

Column 10, line 9, "wight" should read -- weight --;

Column 10, Table 8, first column, third line, "H (Oe)" should read -- $\Delta$H (Oe) --;

Column 11, Table 9, first column, first line "µo" should read -- $\mu_o$ --;

Column 11, line 26, "EXMAPLE 7" should read -- EXAMPLE 7 --;

Column 11, Table 10, first column, first line "µo" should read -- $\mu_o$ --;

Column 11, line 64, after "Table 10,", "µo" should read -- $\mu_o$ --;

Column 12, Table 11, first column, third line "H (Oe)" should read -- $\Delta$H (Oe) --;

Column 13, line 46, "samll" should read -- small --;

Column 14, Table 15, first line, "1-2µ" should read -- 0-2µ --;

UNITED STATES PATENT OFFICE
CERTIFICATE OF CORRECTION

Patent No. 3,917,778  Dated November 4, 1975

Inventor(s) SHIRAKI ET AL

It is certified that error appears in the above-identified patent and that said Letters Patent are hereby corrected as shown below:

Column 15, line 40, after "Triethylamine"," $(c_6H_{15}N)$" should read -- $(C_6H_{15}N)$ --;

Column 16, line 24, after "being a" insert -- metal --.

Signed and Sealed this

Tenth Day of August 1976

[SEAL]

Attest:

RUTH C. MASON
Attesting Officer

C. MARSHALL DANN
Commissioner of Patents and Trademarks